United States Patent
Pellikka et al.

(10) Patent No.: US 9,851,848 B2
(45) Date of Patent: Dec. 26, 2017

(54) TOUCH SENSITIVE DEVICE CASING

(71) Applicant: Microsoft Technology Licensing, LLC, Redmond, WA (US)

(72) Inventors: Matti Pellikka, Lempäälä (FI); Seppo Turunen, Tampere (FI)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/968,364

(22) Filed: Dec. 14, 2015

(65) Prior Publication Data
US 2017/0168601 A1   Jun. 15, 2017

(51) Int. Cl.
G06F 3/0488    (2013.01)
G06F 3/041     (2006.01)
G06F 3/043     (2006.01)

(52) U.S. Cl.
CPC ............ G06F 3/043 (2013.01); G06F 3/0416 (2013.01); G06F 3/0436 (2013.01)

(58) Field of Classification Search
CPC .............................. G06F 3/043; G06F 3/0416
See application file for complete search history.

(56) References Cited

U.S. PATENT DOCUMENTS

| | | | |
|---|---|---|---|
| 7,187,369 B1 * | 3/2007 | Kanbara | G06F 3/0436 345/168 |
| 7,800,592 B2 | 9/2010 | Kerr et al. | |
| 7,920,133 B2 | 4/2011 | Tsumura et al. | |
| 8,922,529 B2 | 12/2014 | Kim | |
| 8,922,983 B1 | 12/2014 | Owen et al. | |
| 8,941,624 B2 | 1/2015 | Kent et al. | |
| 2003/0019669 A1 | 1/2003 | Toda | |
| 2005/0073505 A1 | 4/2005 | Katsuki et al. | |
| 2005/0212775 A1 | 9/2005 | Lee | |
| 2005/0243071 A1 | 11/2005 | Kent et al. | |
| 2006/0071912 A1 | 4/2006 | Hill et al. | |
| 2011/0310028 A1 | 12/2011 | Camp et al. | |
| 2014/0352440 A1 | 12/2014 | Fennell et al. | |
| 2015/0036864 A1 * | 2/2015 | Ozasa | H04R 7/045 381/388 |

(Continued)

FOREIGN PATENT DOCUMENTS

WO    2010043572 A1    4/2010

OTHER PUBLICATIONS

Chowdhury, et al., "Extended Touch User Interfaces", In Proceedings of IEEE International Conference on Multimedia and Expo, Jul. 15, 2013, 6 pages.

(Continued)

*Primary Examiner* — Charles Hicks
(74) *Attorney, Agent, or Firm* — Alleman Hall Creasman & Tuttle LLP (57) ABSTRACT

A device is disclosed, comprising: at least one surface of a device casing, at least one acoustic discontinuity on the at least one surface configured to reflect an ultrasonic acoustic signal, at least one piezoelectric transducer coupled to the at least one surface, configured to induce the ultrasonic acoustic signal in the at least one surface and receive a reflected ultrasonic acoustic signal, wherein an occurrence and location of a touch incident on the at least one surface is determined by analyzing the reflected ultrasonic acoustic signal received by the piezoelectric transducer.

20 Claims, 7 Drawing Sheets

(56) References Cited

U.S. PATENT DOCUMENTS

2016/0246449 A1* 8/2016 Jarske .................. G06F 3/0436

OTHER PUBLICATIONS

Ensminger, et al., "Ultrasonics: Fundamentals, Technologies, and Applications", In Publication of CRC Press, Sep. 19, 2011, 3 pages.
Graff, Karl F., "Wave Motion in Elastic Solids", In Publication of Dover, Jan. 1975, 1 pages.
Valsa, et al., "Approximate Formulae for Numerical Inversion of Laplace Transforms", In International Journal of Numerical Modelling Electronic Networks Devices and Fields, vol. 11, Issue 3, May 1998, pp. 153-166.
Fisher, R. A., "The Use of Multiple Measurements in Taxonomic Problems", In Publication of Annals of Eugenics, vol. 7, Issue 2, Sep. 1936, pp. 179-188.
Bishop, Christopher M., "Pattern Recognition and Machine Learning", In Publication of Springer, Sep. 23, 2015, 17 pages.
ISA European Patent Office, International Search Report and Written Opinion Issued in PCT Application No. PCT/US2016/063804, dated Feb. 24, 2017, WIPO,12 Pages.

* cited by examiner

TOUCH SENSITIVE DEVICE CASING

BACKGROUND

Various electronic devices may comprise a casing comprising outwardly facing keys and buttons. These keys and buttons may have various functions depending on the device. For example, in a smartphone, different keys may correspond to power toggle, volume control, camera control etc. In a multimedia player or a remote controller, the different keys may correspond to, in addition to power and volume control, various multimedia playback controls like next, previous, shuffle, next channel etc. Physical keys may limit freedom in designing and adding functionality to a device.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

A device is described. In an embodiment, a device is disclosed, comprising: at least one surface of a device casing, at least one acoustic discontinuity on the at least one surface configured to reflect an ultrasonic acoustic signal, at least one piezoelectric transducer coupled to the at least one surface, configured to induce the ultrasonic acoustic signal in the at least one surface and receive the reflected ultrasonic acoustic signal, wherein an occurrence and location of a touch incident on the at least one surface is determined by analyzing the reflected ultrasonic acoustic signal received by the piezoelectric transducer.

In other embodiments, a device and a method are discussed.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like references are used to designate like parts in the accompanying drawings.

DETAILED DESCRIPTION

The detailed description provided below in connection with the appended drawings is intended as a description of the embodiments and is not intended to represent the only forms in which the embodiments may be constructed or utilized. However, the same or equivalent functions and structures may be accomplished by different embodiments.

Although the embodiments may be described and illustrated herein as being implemented in a smartphone, this is only an example implementation and not a limitation. As those skilled in the art will appreciate, the present embodiments are suitable for application in a variety of different types of devices comprising a casing and a user interface, for example mobile phones, tablet computers, laptop computers, laptop-tablet hybrid computers, active pen, stylus, media players, gaming consoles, remote controllers, headphones, etc.

The term 'computer', 'computing device', 'apparatus' or 'mobile apparatus' is used herein to refer to any device with processing capability such that it can execute instructions. Those skilled in the art will realize that such processing capabilities are incorporated into many different devices and therefore the terms 'computer' and 'computing device' each include PCs, servers, mobile telephones (including smart phones), tablet computers, set-top boxes, media players, games consoles, active pens, styluses, personal digital assistants and many other devices.

Figure 1:
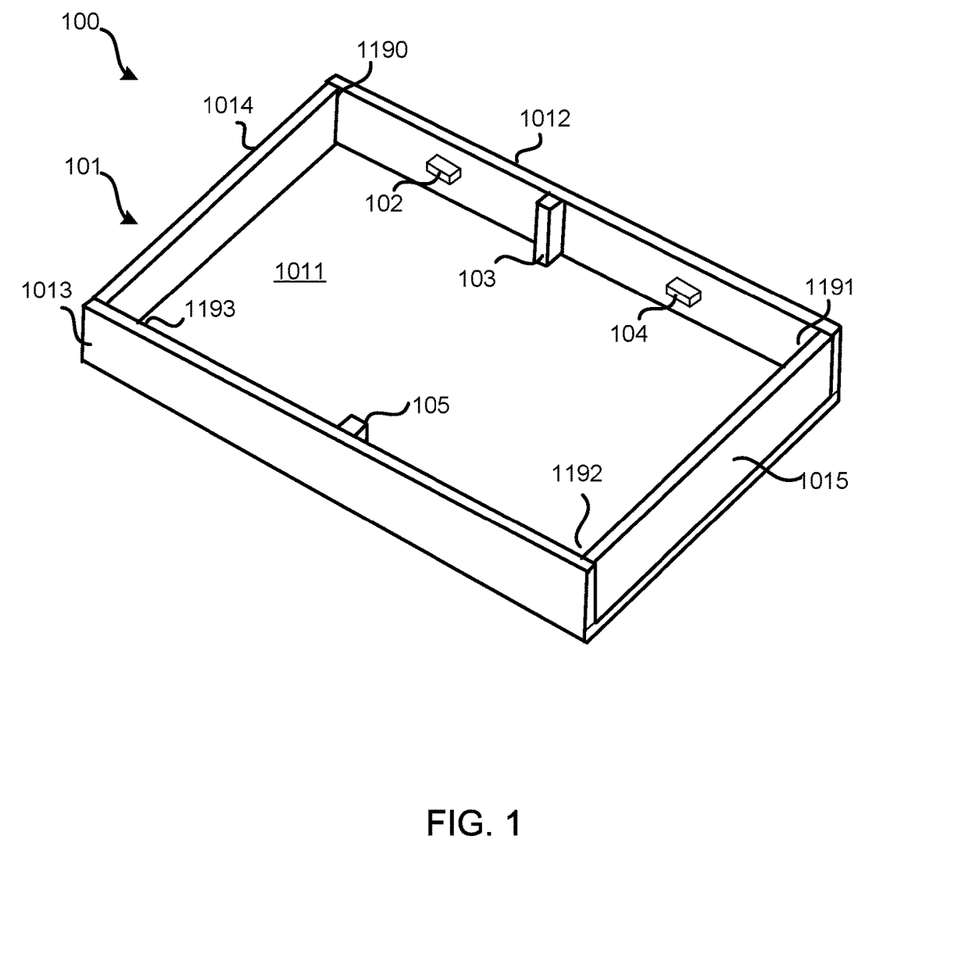
FIG. 1 illustrates a perspective view of a casing of a computing device for determining a touch incident based on an acoustic signal according to an embodiment.

FIG. 1 illustrates a schematic representation of a device 100 comprising a device casing 101 and piezoelectric transducers 102, 104 positioned on the device casing, according to an embodiment. Device casing 101 may comprise a horizontal wall 1011, four vertical walls 1012, 1013, 1014 and acoustic discontinuities in the form of reflectors 103, 105, and corners 1190, 1191, 1192, 1193 in the device casing 101. On the inside of walls 1011, 1012, 1013, 1014, 1015 for example those facing inwards and not visible to a user, piezoelectric transducers, for example 102, 104 may be disposed. Reflectors 103, 105 may be positioned on the inside of these surfaces as well. Acoustic discontinuities as mentioned herein and hereinafter may include any physical structures and features or lack thereof in device casing 101, which may cause a change in acoustic wave propagation characteristics over and above the normal attenuation that may be suffered during propagation due to the dampening characteristics of the material employed. Acoustic discontinuities may also be implemented by introducing media interfaces, for example, by introducing regions of acoustically different material in the casing 101. Acoustic discontinuities may include corners 1190, 1191, 1192, 1193 in device casing 101; however, every acoustic discontinuity need not be a corner in the device casing 101. Acoustic discontinuities may include reflectors 103, 105 positioned on the device casing 101. Reflectors 103, 105 may be short projections of material extending, from a device casing 101, inwards into the device. Changes in acoustic signals caused by these acoustic discontinuities may include reflection, absorption, phase reversal etc. According to an embodiment, device casing 101 may be manufactured so that all the walls 1012, 1013, 1014, 1015 are formed from a single piece of material with no joints involved. According to another embodiment, device casing 101 may comprise more than one piece of material, for example, involving joints.

Referring to FIG. 1, device casing 101 may enclose various components like processors, storage, input and output devices etc. (not illustrated in FIG. 1) comprising device 100. Device casing 101 comprises walls 1012, 1013, 1014, 1015 extending vertically or substantially vertically from a horizontal portion 1011. Corners 1190, 1191, 1192 and 1193 may be formed between the vertical wall pairs: 1012 and 1014, 1012 and 1015, 1015 and 1013, 1013 and 1014, respectively. According to an embodiment, a single piece of material may comprise vertical walls 1012, 1013, 1014, 1015. According to an embodiment, vertical walls 1012, 1013, 1014, 1015 may be physically separate pieces joined either permanently, for example by welding or adhesives; or temporarily, for example, by physical connectors like joints and/or hinges. Piezoelectric transducers 102, 104 and reflectors 103, 105 may be attached to one or more vertical walls 1012, 1013, 1014, 1015. Referring to FIG. 1, piezoelectric transducers 102 and 104 may be attached to wall 1012 at a distance equal to or around a quarter of the total length from the ends of wall 1012. According to an embodiment, reflector 103 may be positioned substantially in the middle of wall 1012. Piezo electric transducers may be attached on the inside of wall 1012 so as to be able to induce and/or detect and receive ultrasonic or flexural acoustic waves in wall 1012. Further, the piezoelectric transducers may be attached to a wall such that they are invisible and indiscernible to the user from outside. An outside design of the device casing 101 may be smooth and clean without discontinues. There is no need to have discontinues such as buttons and their openings.

According to an embodiment casing 101 may comprise a surface (not illustrated in FIG. 1) opposing horizontal surface 1011 to form an enclosure. According to an embodiment, the surface may be a glass surface. According to another embodiment, the surface may be a conductive surface. According to an embodiment, device casing 101 may be comprised of a conductive material, for example, a metal. According to another embodiment, the device casing 101 may comprise a non-conductive material.

Referring to FIG. 1, each of the piezoelectric transducers 102, 104 may be time multiplexed so that it acts as generator of acoustic waves during one time period and a receiver of acoustic waves during other time periods. When acoustic signals are generated by piezoelectric transducers 102, 104, they may induce ultrasonic or flexural acoustic waves in wall 1012. Travelling across the length of wall 1012, these waves may encounter acoustic discontinuities such as reflector 103 or corners 1190, 1191 of device casing 101. At acoustic discontinuities, at least some portion of these acoustic waves may be reflected back towards the piezoelectric transducers 102, 104, which at this stage may have switched to a receiver mode and hence receive the reflected signals. The properties of reflected signals may change when, for example, a human appendage comes in contact with the outside of wall 1012. The occurrence and location of such touch by a human appendage may be determined, for example, by comparing the properties of reflected signals when wall 1012 is touched to the properties of reflected signals in absence of any touch. According to an embodiment, piezoelectric transducer 102 induces and receives ultrasonic or flexural acoustic waves from one section of wall 1012 as defined by the corner 1190 and the reflector 103. According to an embodiment, the area between two acoustic discontinuities for example corner 1190 and reflector 103 is defined as one touch area wherein any incidents are recognized but not discerned from each other. According to an embodiment, the area between two acoustic discontinuities for example corner 1190 and reflector 103, is divided into two touch areas wherein touch incidents are recognized and their location determined to be on either one side of piezoelectric transducer 102 for example either the between corner 1190 and piezoelectric transducer 102 or between piezoelectric transducer 102 and reflector 103. According to an embodiment, the time period during which transducers 102 and 104 receive acoustic signals may be defined so as to exclude stray signals. Stray signals may be, for example, reflections of acoustic signals from acoustic discontinuities other than ones nearest to the transducer in either direction. Stray signals may also be, for example, acoustic signals transmitted by other piezoelectric transducers or their reflections.

According to an embodiment, flexural acoustic waves or respective signals, as those skilled in the art would appreciate, may refer to waves in media where thickness of the medium is small compared to the wavelength. Such media may include plates and bars. In flexural acoustic wave propagation, local displacement of the material may be perpendicular to the direction of propagation of the wave. Flexural waves may be alternatively called as ultrasonic waves. Furthermore, flexural waves may be alternately called as bending waves or asymmetric lamb waves. With devices and device casings getting thinner, flexural acoustic waves may be the dominant mode of acoustic wave propagation in device casings.

According to an embodiment, a touch sensor based on ultrasonic vibrations propagating as flexural waves, such as bending waves, in a casing 101 is presented. The operation of the sensor is based on selective attenuation of the vibrations when the casing 101 is touched. The vibrations are excited and their attenuation profile recorded using a piezoelectric element 102. A burst waveform in the frequency band of 60-80 kHz may be used as the excitation. The attenuation profile is subjected to classification by linear discriminant analysis to achieve positional resolution.

Structural ultrasonic sensing, as a phenomena exploited, include reflection, attenuation, propagation speed variation, and conversion of vibration mode. According to an embodiment, the phenomena may be used first to guide ultrasonic waves in the casing 101 and then to detect if there is, for example a human skin, in contact with the casing 101. The vertical walls 1012, 1013, 1014, 1015 of the casing 101 constitutes an ultrasonic waveguide where geometric discontinuities, such as end points and thickenings, act as reflectors. The ultrasonic transmitter, such as the piezo electric transducer 102, may be attached to the wall, two incident waves 300,301, propagating in opposite directions, are excited. Both waves are reflected 302,303 by suitably placed discontinuities and subsequently picked up by the transmitter acting also as a receiver. According to an embodiment, human skin in touch with the wall attenuates both the incident 300,301 and reflected 302,303 waves due to the absorption of wave energy by skin tissue. The locations of a single or multiple touch points can be determined by analyzing the waveforms of the reflected waves 302,303. For example, if the transmitter is placed off-center, the reflected waves will be interleaved in time and can be separated from each other.

Figure 2:
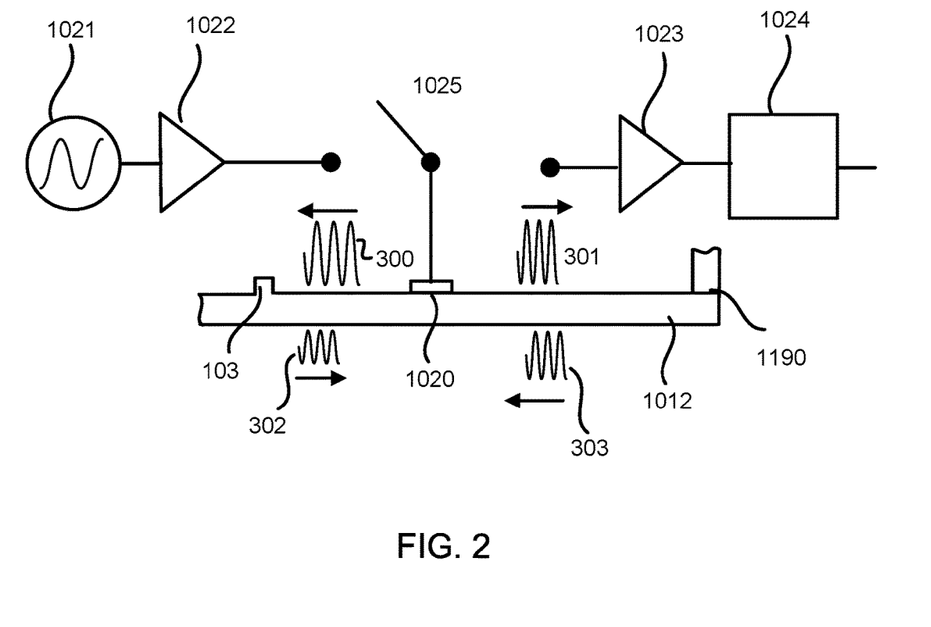
FIG. 2 illustrates a schematic representation of transducer and its switching between a transmitter and a receiver mode according to an embodiment.

FIG. 2 illustrates a schematic representation of a circuit representing a piezoelectric transducer 102 and its switching. Piezo electric transducer 102 may comprise a piezoelectric crystal 1020, a signal generator 1021, unidirectional filters or switches 1022, 1023, a signal receiver 1024 and a switch 1025. Piezoelectric transducer 102 may alternate between a transmitter mode, during which it generates acoustic waves and induces flexural acoustic waves in wall 1012; and a receiver mode, during which it detects and receives flexural acoustic waves reflected by acoustic discontinuities 103, 119. Unidirectional switch 1022 may be connected between signal generator 1021 and piezoelectric crystal 1020 to ensure signal propagation only from the signal generator towards the piezoelectric crystal 1020. Similarly, unidirectional switch 1023 may be connected between the piezoelectric crystal 1020 and the receiver 1024 to ensure signals travel only from piezoelectric crystal 1020 towards receiver 1024 when the piezoelectric transducer 102 is in a receiver mode.

Referring to FIG. 2, in transmission mode, switch 1025 may connect the piezoelectric crystal 1020 to generator 1021 via unidirectional filter 1022. The acoustic signals generated by generator 1021 may cause piezoelectric crystal 1020 to vibrate and induce flexural acoustic waves 300, 301 in wall 1012. Flexural acoustic waves so induced may travel away from crystal 1020, till they are reflected, at least partially, by acoustic discontinuities 103, 1190. In receiver mode, switch 1025 may connect the piezoelectric crystal 1020 to receiver 1024 via one way filter 1023. Flexural acoustic waves 302, 303 travelling towards the piezoelectric crystal may induce signals in the piezoelectric crystal which may be transmitted, conducted, or sent to receiver 1024. Flexural acoustic waves 302, 303 may be reflected portions of flexural acoustic waves 300, 301. The timing of switching may be set so that only acoustic flexural waves originating from piezoelectric transducer 102 and reflected by acoustic discontinuities 103 and 119 towards the piezoelectric transducer are received in the receiver mode. This may be done, for example, to preclude flexural acoustic waves from other piezoelectric transducers which may be positioned on the casing from being detected by receiver 1024. It should be noted that the acoustic waveforms 300,301,302, and 303 illustrated in FIG. 2 are indicative only and may not correspond in shape, magnitude, mode or any other aspect to actual waveforms propagating on device casing wall 1012.

Referring to FIG. 2, according to an embodiment, signal generator 1021 may generate electrical signals with a frequency or a range of frequency chosen from a range of frequencies from 20 kHz to 200 kHz. Consequently, flexural waves induced by the piezoelectric crystal 1020 may have the same range of frequencies. According to an embodiment, receiver 1024 may sample the received signals at a frequency of the order a few MHz to form a digital equivalent of the received signals. According to an embodiment, the sampling frequency may be 1 MHz. According to an embodiment, the piezoelectric transducer 102 may switch between transmission mode and receiver mode after a time period of the order of tens of micro seconds. According to an embodiment, the time period between switching may be 50 μS. According to an embodiment, stray flexural acoustic signals, for example flexural acoustic signals from other piezoelectric transducers and reflections from non-immediate acoustic discontinuities may be filtered out by restricting the time period for reception.

Referring to an embodiment illustrated in FIG. 2, wall 1012 may be a metallic wall for example made of aluminum or steel. According to an embodiment, touch sensitive regions so formed may be configured to be used in lieu of physical controls like keys and buttons. The touch sensitive region may be roughened to contain a roughening covering at least part of the region. Furthermore, the touch sensitive region may be colored or otherwise drawing an attention of the user.

Figure 3:
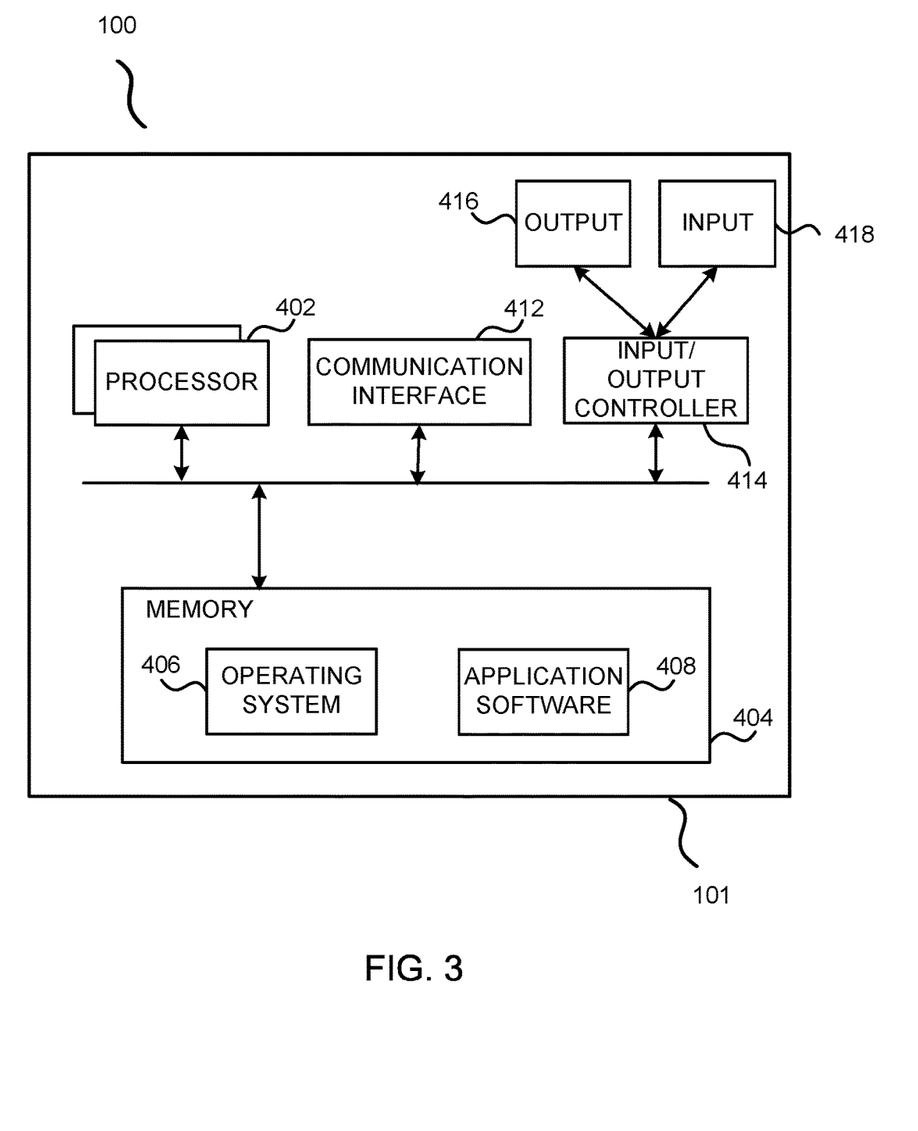
FIG. 3 illustrates a schematic representation of a computing device for determining a touch incident based on an acoustic signal according to an embodiment.

FIG. 3 illustrates an example of components of device 100, according to an embodiment, which may be implemented as a form of a computing and/or electronic device. The computing device 100 comprises one or more processors 402 which may be micro-processors, controllers or any other suitable type of processors for processing computer executable instructions to control the operation of the apparatus 100. Platform software comprising an operating system 406 or any other suitable platform software may be provided on the apparatus to enable application software 408 to be executed on the device. Some or all the components described herein may be enclosed in a casing 101.

Computer executable instructions may be provided using any computer-readable media that are accessible by the device 100. Computer-readable media may include, for example, computer storage media such as a memory 404 and communications media. Computer storage media, such as a memory 404, include volatile and non-volatile, removable and non-removable media implemented in any method or technology for storage of information such as computer readable instructions, data structures, program modules or other data. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media do not include communication media. Therefore, a computer storage medium should not be interpreted to be a propagating signal per se. Propagated signals may be present in computer storage media, but propagated signals per se are not examples of computer storage media. Although the computer storage medium (the memory 404) is shown within the device 100, it will be appreciated by a person skilled in the art, that the storage may be distributed or located remotely and accessed via a network or other communication link (e.g. using a communication interface 412).

The device 100 may comprise an input/output controller 414 arranged to output information to an output device 416 which may be separate from or integral to the device 100. The input/output controller 414 may also be arranged to receive and process an input from one or more input devices 418 which may be separate from or integral to the device 100. In one embodiment, the casing 101 may be interfaced with the input/output controller 412. In one embodiment, the output device 416 may also act as the input device. According to an embodiment, casing 101 may enclose an input/output device 416 which is separate from device 100, for example a controller for a headset. The input/output controller 414 may also output data to devices other than the output device, for example a locally connected printing device. According to an embodiment analysis of reflected flexural acoustic waves, touch detection and its location determination, and/or any other functionality as described in the embodiments, may be implemented by software or firmware; for example, the operating system 406 and the application software 408 working together and/or independently, and executed by the processor 402.

The functionality described herein in the embodiments may be performed, at least in part, by one or more hardware logic components. According to an embodiment, the computing device 100 is configured by the program code 406, 408 when executed by the processor 402 to execute the embodiments of the operations and functionality described. Alternatively, or in addition, the functionality described herein may be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 4:
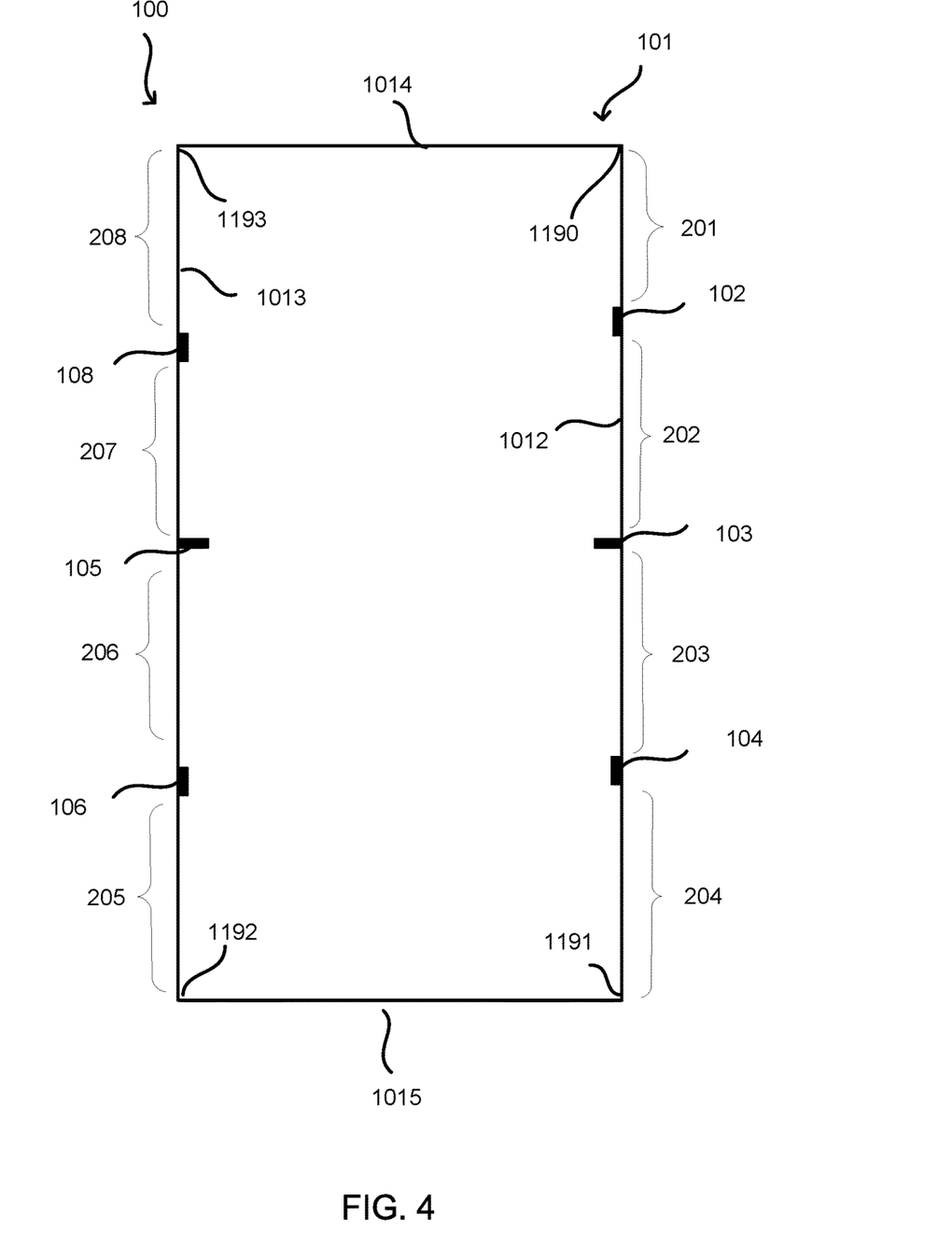
FIG. 4 illustrates a schematic representation of a computing device, illustrating the device casing and various piezoelectric transducers and acoustic discontinuities according to an embodiment.
Figure 5:
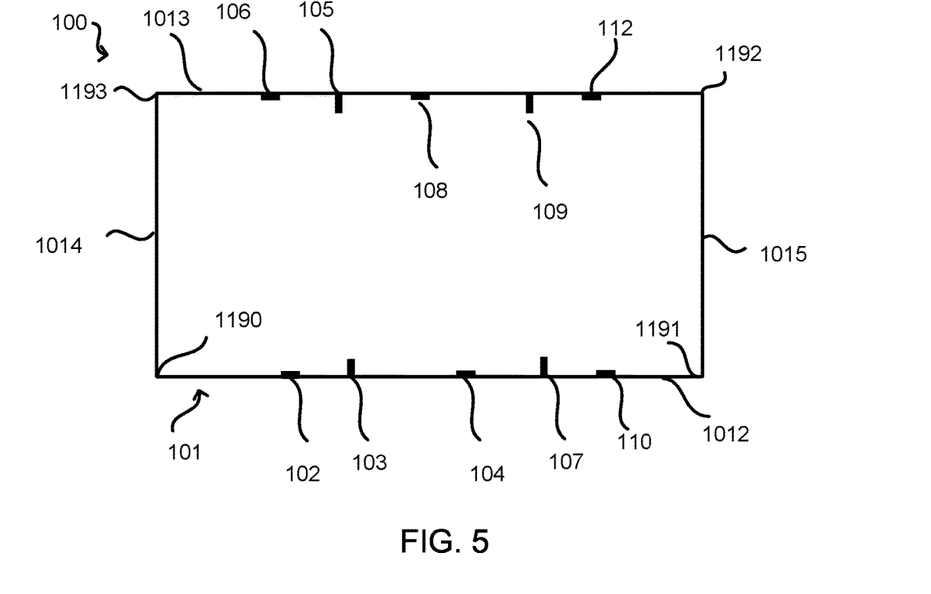
FIG. 5 and FIG. 6 illustrate various configurations of piezoelectric transducers in a device casing according to an embodiment.
Figure 6:
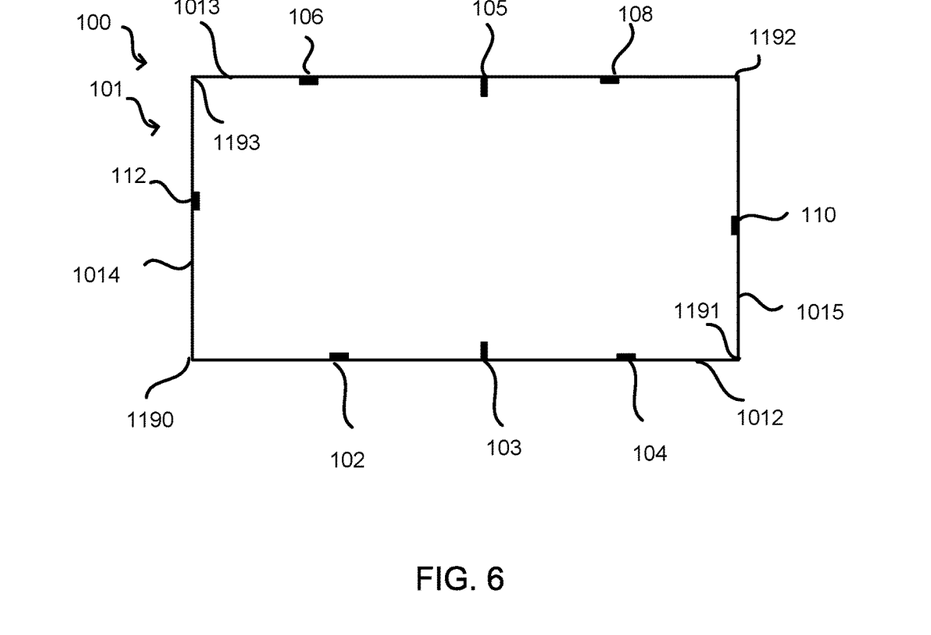

FIGS. 4, 5 and 6 illustrate various embodiments for configuring piezoelectric transducers and reflectors on the inner surfaces of a device casing according to the various embodiments. Referring to FIG. 4, two each of four piezoelectric transducers 102, 104, 106 and 108 may be positioned on inside of walls 1012 and 1013, substantially at quarter length positions of the respective wall. Further reflector 103 in the form of a ridge is positioned substantially in the middle of wall 1012. Reflector 105 is positioned substantially in the middle of wall 1013. According to an embodiment, piezoelectric transducers and reflectors may be positioned so as to divide a wall into portions with slightly different lengths. For example piezoelectric transducers 102, 104 and reflector 103 may be positioned so that the segment of wall 1012 between corner 1190 and piezoelectric transducer 102 is unequal to length of segment between piezoelectric transducer 102 and reflector 103. Each one of transducers 102, 104, 106, 108 induces flexural acoustic waves in the walls they are attached to and receives flexural acoustic waves reflected by the acoustic discontinuities. Occurrence and location of touch incidents is determined by analyzing the received flexural acoustic waves. According to an embodiment, each piezoelectric transducer supports two touch sensitive regions, one on its each side; each region extending from the piezoelectric transducer on a wall to the next acoustic discontinuity on the wall. For example, piezoelectric transducer 102 may support two touch sensitive regions 201 and 202. According to an embodiment, vertical walls 1012, 1013 of device casing 101 may be divided into eight unique regions 201, 202, 203, 204, 205, 206, 207, 208 where touch incidents are detectable. Consequently, conventional buttons or switches may be replaced by the embodiments. According to an embodiment, the area which is touch sensitive, for example 201, may be adjusted by adjusting the frequency of induced flexural acoustic waves and/or the timing of switching of the piezoelectric transducer 102, for example, by changing the duration of transmission and/or reception of acoustic waves. The touch sensitive region 201, 202, 203, 204, 205, 206, 207, 208 may be roughened to contain a roughening covering at least part of the region. Furthermore, the touch sensitive region 201, 202, 203, 204, 205, 206, 207, 208 may be colored or otherwise drawing an attention of the user.

Referring to FIG. 5, device 100 may comprise a device casing 101 so that on each vertical wall 1012, 1013, three piezoelectric transducers and two reflectors are attached. On wall 1012, piezoelectric transducers 102, 104 and 110 are positioned substantially at quarter length intervals. Similarly, on wall 1013, piezoelectric transducers 106, 108 and 112 are positioned substantially at quarter-length intervals on wall 1013. Reflectors 103, 107 are positioned substantially at one thirds and two thirds of the length of wall 1012. Similarly, reflectors 105 and 109 are positioned substantially at one third and two thirds of the length of wall 1013. According to an embodiment, each piezoelectric transducer may form two regions of touch sensitive surface on the wall it is attached to. Each touch sensitive region may extend from the piezoelectric transducer to the nearest acoustic discontinuity from that piezoelectric transducer. According to an embodiment, the piezoelectric transducers and reflectors are positioned so that the touch sensitive areas formed may differ in length from each other.

Referring to FIG. 6, a device 100 may comprise a device casing 101 so that on each vertical wall 1012, 1013, 1014, 1015 at least one piezoelectric transducer is positioned on its inside. On wall 1012, piezoelectric transducers 102, 104 are positioned at substantially one third and two thirds of the total length of wall 1012. Reflector 103 is positioned substantially in the middle of wall 1012. On wall 1013, piezoelectric transducers 106, 108 are positioned at substantially one third and two thirds of total length of wall 1013. Reflector 105 is positioned at substantially the middle of wall 1013. Further on wall 1012, a piezoelectric transducer 112 is positioned substantially in the middle of wall 1012. Similarly a piezoelectric transducer may be positioned on wall 1015. According to an embodiment, each transducer may support two location/regions of touch sensitive area. One on its either side, between the piezoelectric transducer and an acoustic discontinuity.

Figure 7:
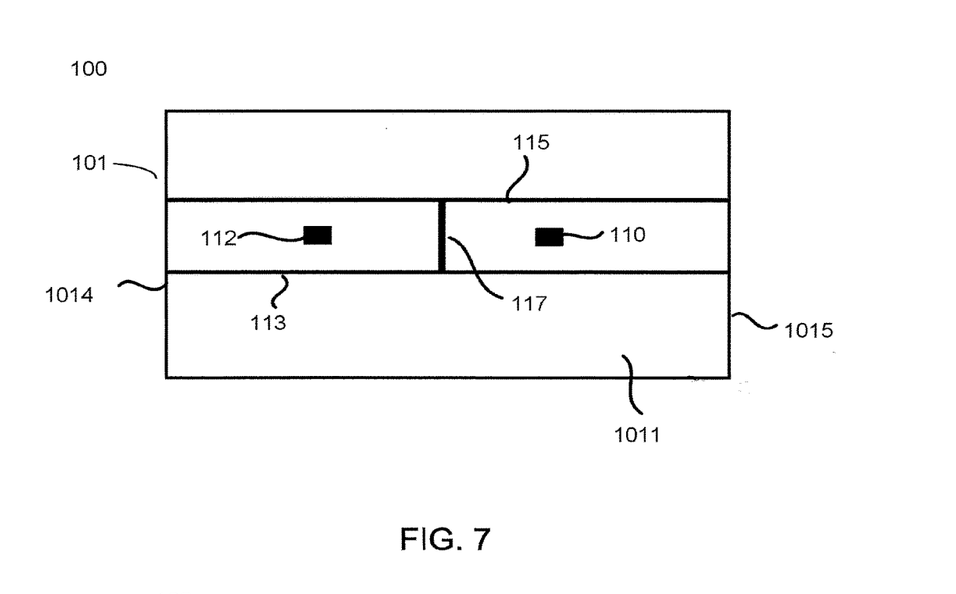
FIG. 7 illustrates a device casing comprising a touch sensitive backside according to an embodiment.
Figure 8:
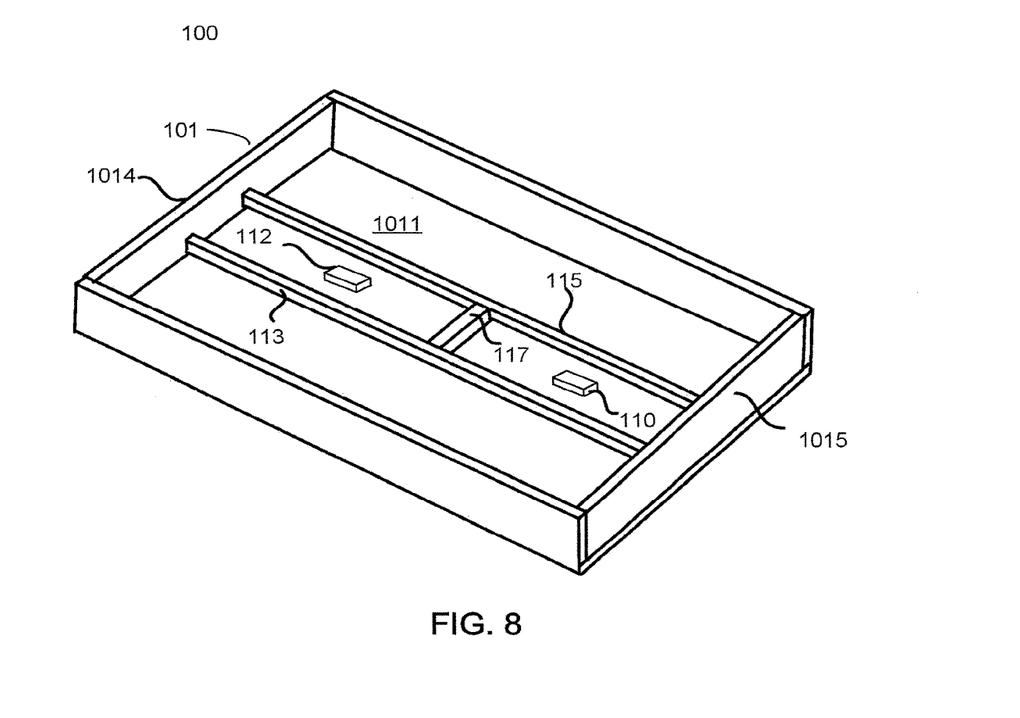
FIG. 8 illustrates a perspective view of a device casing comprising a touch sensitive backside according to an embodiment.

FIGS. 7 and 8 illustrates a device 100, according to an embodiment, wherein at least a part of the backside of the device casing 101 may be configured to be touch sensitive. In an embodiment illustrated in FIG. 7, at least one piezoelectric transducer 110, 112 is attached to a horizontal wall 1011 of the device casing 101. Further two ridges 115, 113 are positioned on horizontal wall 1011, one on each side of the piezoelectric transducers 110, 112. A reflector 117 is positioned on wall 1011 in between the two piezoelectric transducers 110, 112. According to an embodiment, ridges 115 and 113 may guide flexural acoustic waves in wall 1011 induced by piezoelectric transducers 110, 112 along the channel formed in between the ridges 115, 113. For example, flexural acoustic waves may be induced by piezoelectric transducers 110, 112 in wall 1011. The waves so induced may be confined to travel only parallel to and in between the ridges 113, 115. Each transducer may receive reflected flexural waves from its corresponding segment as defined by reflector 117 and walls 1015 and 1014. By analyzing the received flexural acoustic waves, occurrence and location of touch incidents may be determined. FIG. 8 illustrates a perspective sectional view of an embodiment illustrated in FIG. 7.

Figure 9:
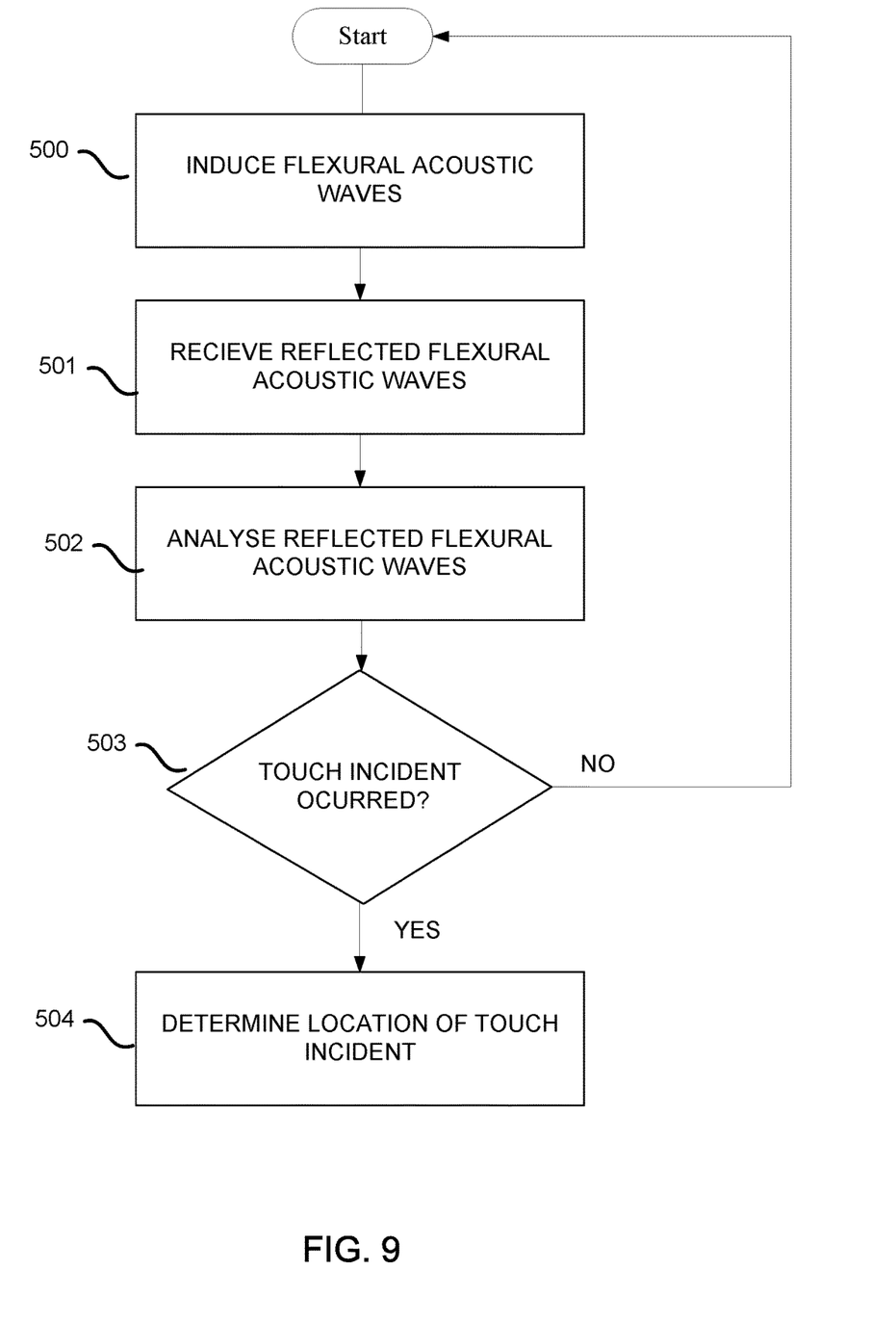
FIG. 9 illustrates a schematic flow chart of a method of detecting touch in a device casing in accordance with an embodiment.

FIG. 9 illustrates, as a schematic flow chart, a method of determining an occurrence and location of a touch incident in accordance with an embodiment. Referring to FIG. 9, according to an embodiment the process comprises steps 500, 501, 502 and 503. According to an embodiment, the process of FIG. 9 may be compiled into the program code 406, 408.

Step 500 may comprise inducing flexural acoustic waves in a surface. According to an embodiment, the surface may be a device casing and flexural acoustic waves may be induced by a piezoelectric transducer.

Step 501 may comprise receiving reflections of the flexural acoustic waves induced in step 500. According to an embodiment, the reflections may occur due to suitably positioned acoustic discontinuities. According to an embodiment, the reflections may be received only during a certain time period starting from the time of induction of flexural acoustic waves.

Step 502 may comprise analyzing the received flexural waves. According to an embodiment, this analysis may be carried out by a digital processor, caused to do so by suitable instructions stored in a storage. According to an embodiment, the analysis may be carried out by hardware either before converting the received reflected waves into equivalent digital signals or after converting the received reflected flexural acoustic waves into equivalent digital signals.

Step 503 may comprise determining, based on the analysis done in step 502, if a touch incident has occurred. According to an embodiment, this determination may be achieved by various signal processing and machine learning techniques. If a touch incident has occurred, step 504 may be performed.

Step 504 may comprise determining the location of the touch incident detected in step 503. According to an embodiment, the determination of occurrence and location of a touch incident may be achieved by various signal processing and machine learning techniques. According to an embodiment, the determination of occurrence and location of a touch incident may be based on a lookup table. The lookup table may comprise wave patterns associated with occurrence or lack thereof of a touch incident and the corresponding touch incident location.

According to an embodiment the algorithm may be used to detect the reflected flexural acoustic signal. The signal processing algorithm may be a general machine learning algorithm that uses a training set of recorded touches, no-touches, and touches outside the desired touch region to distinguish the touch of the touch regions and their locations from the other cases. According to an embodiment, the device 100 may output a feedback when a touch region is touched, and corresponding action launched. The feedback may be visual, audio or tactile. There may be different kind of feedback corresponding to different touch regions. According to an embodiment, the device 100 is configured to correct errors of accidental touches of the regions. If a touch is recognized by the device 100 as a non-desired touch, it may be ignored. For example, if user is, while holding the device 100, accidentally touching any of the regions, the touch may be ignored when it is recognized as undesired.

The methods and functionalities described herein may be performed by software in machine readable form on a tangible storage medium e.g. in the form of a computer program comprising computer program code means adapted to perform some or all the functions and the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store, parts or all of, an example of the process described as software. A local or terminal computer may access the remote computer and download a part or all of the software to run the program. Alternatively, the local computer may download pieces of the software as needed, or execute some software instructions at the local terminal and some at the remote computer (or computer network). Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

According to an embodiment, a device comprising: at least one wall of a device casing; at least one acoustic discontinuity on an inside of the at least one wall configured to reflect an ultrasonic acoustic signal; at least one piezoelectric transducer coupled to the at least one wall, configured to induce the ultrasonic acoustic signal in the at least one wall and receive a reflected ultrasonic acoustic signal; wherein an occurrence and location of a touch incident on the at least one surface is determined by analyzing the reflected ultrasonic acoustic signal received by the piezoelectric transducer.

Alternatively or in addition to the above, the wall is a lateral wall of the device casing.

Alternatively or in addition to the above, comprising two piezoelectric transducers on a single wall separated by a distance substantially close to half the length of the wall, further comprising an acoustic discontinuity in between the transducers.

Alternatively or in addition to the above, the ultrasonic acoustic signal comprises a flexural acoustic signal.

Alternatively or in addition to the above, the wall is the backside of the device casing.

Alternatively or in addition to the above, comprising two substantially parallel ridges on the surface enclosing the at least one acoustic discontinuity and the at least one piezoelectric transducer.

Alternatively or in addition to the above, the casing is made, at least in part, of metal.

Alternatively or in addition to the above, only reflected ultrasonic acoustic signal received in a window of time from the time of induction are used to determine occurrence and location of a touch incident.

Alternatively or in addition to the above, the time window is of the order of tens of microseconds.

Alternatively or in addition to the above, the piezoelectric transducer induces ultrasonic waves of a frequency from the frequency range of 20 kHz to 200 kHz, wherein the ultrasonic waves correspondences to the ultrasonic acoustic signal.

Alternatively or in addition to the above, each piezoelectric transducer supports at least two touch sensitive regions.

Alternatively or in addition to the above, comprising a processor and a storage containing instructions, wherein the instructions cause the processor to determine the occurrence and location of a touch incident by analyzing the reflected ultrasonic acoustic signals.

Alternatively or in addition to the above, the storage further comprises instructions which cause the processor to perform a function based on the determined occurrence and location of a touch incident.

Alternatively or in addition to the above, the function is selected from one of: device volume control, device camera control, device brightness control, music playlist control, and device power state.

Alternatively or in addition to the above, at least one function is assigned to each location where touch can be identified.

Alternatively or in addition to the above, comprising a logic circuit to determine the occurrence and location of a touch incident by analyzing the induced and reflected ultrasonic acoustic signals.

Alternatively or in addition to the above, comprising a processor and a storage containing instructions, wherein the instructions cause the processor to perform a function based on the determination of occurrence and location of a touch incident by the logic circuit.

According to an embodiment, a mobile device comprising: at least one wall of a device casing; at least one acoustic discontinuity on an inside surface at least one wall configured to reflect a flexural acoustic signal; at least one piezoelectric transducer coupled to the inside surface of the at least one wall, configured to induce the flexural acoustic signal in the at least one surface and receive a reflected acoustic signal; wherein an occurrence and location of a touch incident on an outside surface of the at least one wall is determined by analyzing the reflected acoustic signal received by the piezoelectric transducer.

Alternatively or in addition to the above, further comprising a display, wherein the piezoelectric transducers are configured on an inside surface of a wall of the casing, the wall being substantially perpendicular or substantially parallel to the display.

According to an embodiment, a method, comprising: inducing ultrasonic acoustic waves in a device casing; receiving the ultrasonic acoustic waves reflected from acoustic discontinuities of the device; analyzing the received ultrasonic acoustic waves; determining if a touch incident has occurred based on the analysis ultrasonic acoustic waves so performed; and if a touch incident has occurred, determining its location.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device comprising:
   at least one wall of a device casing;
   at least one acoustic discontinuity on an inside of the at least one wall configured to reflect an ultrasonic acoustic signal and defining, in part, at least one touch sensitive region that is a sub-region of at least one surface; and
   at least one piezoelectric transducer coupled to the at least one wall and defining, in part, the at least one touch sensitive region, the at least one piezoelectric transducer being configured to induce the ultrasonic acoustic signal in the at least one wall and receive a reflected ultrasonic acoustic signal;
   wherein an occurrence and location of a touch incident on the at least one surface is determined by analyzing the reflected ultrasonic acoustic signal received by the at least one piezoelectric transducer.

2. The device of claim 1, wherein the at least one wall is a lateral wall of the device casing.

3. The device of claim 2, comprising two piezoelectric transducers on a single wall separated by a distance substantially close to half the length of the at least one wall, further comprising the at least one acoustic discontinuity in between the transducers.

4. The device of claim 1, wherein the ultrasonic acoustic signal comprises a flexural acoustic signal.

5. The device of claim 1, wherein the at least one wall is the backside of the device casing.

6. The device of claim 5, further comprising two substantially parallel ridges on the at least one surface enclosing the at least one acoustic discontinuity and the at least one piezoelectric transducer.

7. The device of claim 1, wherein the casing is made, at least in part, of metal.

8. The device of claim 1, wherein only reflected ultrasonic acoustic signals received in a window of time from a time of induction are used to determine occurrence and location of the touch incident.

9. The device of claim 8, wherein the window of time is of the order of tens of microseconds.

10. The device of claim 1, wherein the at least one piezoelectric transducer induces ultrasonic waves of a frequency from the frequency range of 20 kHz to 200 kHz, wherein the ultrasonic waves correspond to the ultrasonic acoustic signal.

11. The device of claim 1, wherein each piezoelectric transducer supports at least two touch sensitive regions.

12. The device of claim 1, further comprising a processor and a storage containing instructions, wherein the instructions cause the processor to determine the occurrence and location of the touch incident by analyzing the reflected ultrasonic acoustic signals.

13. The device of claim 12, wherein the storage further comprises instructions which cause the processor to perform a function based on the determined occurrence and location of the touch incident.

14. The device of claim 13, wherein the function is selected from one of:
device volume control, device camera control, device brightness control, music playlist control, and device power state.

15. The device of claim 14, wherein at least one function is assigned to each location where touch can be identified.

16. The device of claim 1, comprising a logic circuit to determine the occurrence and location of the touch incident by analyzing the induced and reflected ultrasonic acoustic signals.

17. The device of claim 16, further comprising a processor and a storage containing instructions, wherein the instructions cause the processor to perform a function based on the determination of occurrence and location of the touch incident by the logic circuit.

18. A mobile device comprising:
at least one wall of a device casing;
at least one acoustic discontinuity on an inside of the at least one wall configured to reflect a flexural acoustic signal and defining, in part, at least one touch sensitive region that is a sub-region of at least one surface; and
at least one piezoelectric transducer coupled to the at least one wall and defining, in part, the at least one touch sensitive region, the at least one piezoelectric transducer being configured to induce the flexural acoustic signal in the at least one wall and receive a reflected acoustic signal;
wherein an occurrence and location of a touch incident on an outside surface of the at least one wall is determined by analyzing the reflected acoustic signal received by the at least one piezoelectric transducer.

19. The device of claim 18, further comprising a display, wherein the piezoelectric transducers are configured on the inside of the at least one wall of the device casing, the wall being substantially perpendicular or substantially parallel to the display.

20. A method, comprising:
inducing ultrasonic acoustic waves in a device casing via at least one piezoelectric transducer coupled to at least one wall of the device casing, the at least one piezoelectric transducer defining, in part, at least one touch sensitive region that is a sub-region of at least one surface;
receiving the ultrasonic acoustic waves reflected from acoustic discontinuities of the device at the at least one piezoelectric transducer, at least one acoustic discontinuity defining, in part, the at least one touch sensitive region;
analyzing the received ultrasonic acoustic waves;
determining whether a touch incident has occurred on the at least one surface based on the analysis of the received ultrasonic acoustic waves so performed;
and when the touch incident has occurred, determining its location.

* * * * *